(12) United States Patent
England et al.

(10) Patent No.:  US 12,658,681 B2
(45) Date of Patent:       Jun. 16, 2026

(54) ELBOW CABLE CONNECTOR WITH STRAIN RELIEF ELEMENT

(71) Applicant: LATELEC, Toulouse (FR)

(72) Inventors: Sam England, Aberdeenshire (GB);
Daren Thomas, Aberdeenshire (GB)

(73) Assignee: LATELEC, Toulouse (FR)

( * ) Notice: Subject to any disclaimer, the term of this patent is extended or adjusted under 35 U.S.C. 154(b) by 334 days.

(21) Appl. No.: 18/292,651

(22) PCT Filed: Jul. 25, 2022

(86) PCT No.: PCT/EP2022/070847
§ 371 (c)(1),
(2) Date: Jan. 26, 2024

(87) PCT Pub. No.: WO2023/006693
PCT Pub. Date: Feb. 2, 2023

(65) Prior Publication Data
US 2024/0345331 A1      Oct. 17, 2024

(30) Foreign Application Priority Data
Jul. 29, 2021     (FR) ..................................... 2108251

(51) Int. Cl.
G02B 6/00          (2006.01)
G02B 6/38          (2006.01)
G02B 6/44          (2006.01)
H02G 3/06          (2006.01)

(52) U.S. Cl.
CPC ......... H02G 3/0633 (2013.01); G02B 6/3829 (2013.01); G02B 6/3887 (2013.01); G02B 6/44765 (2023.05)

(58) Field of Classification Search
CPC .. H02G 3/0633; H02G 15/007; G02B 6/3829; G02B 6/3887; G02B 6/44765; G02B 6/2938; G02B 6/00
See application file for complete search history.

(56) References Cited

U.S. PATENT DOCUMENTS

| | | | | |
|---|---|---|---|---|
| 4,430,523 A | 2/1984 | Hayes | | |
| 4,653,848 A | 3/1987 | Kloots | | |
| 7,467,896 B2 * | 12/2008 | Melton | ................ | G02B 6/4433 |
| | | | | 385/86 |
| 8,388,235 B1 * | 3/2013 | Volker | ................ | G02B 6/3816 |
| | | | | 385/71 |
| 8,791,374 B1 | 7/2014 | Smith | | |
| 10,770,832 B2 * | 9/2020 | Franke | ................ | H02G 15/113 |

FOREIGN PATENT DOCUMENTS

WO      WO2020086942      4/2020

* cited by examiner

*Primary Examiner* — Jennifer Doan
(74) *Attorney, Agent, or Firm* — Defillo & Associates, Inc.; Evelyn A. Defillo

(57)      ABSTRACT

An elbow connection (1) of at least one cable (7) producing a mechanical connection and a cable connection on a flat face (1*a*) of an equipment item and having a strain relief (5) composed of two half-shells (5*a*, 5*j*) providing a protection for each cable (7) in the case of stress by at least one longitudinal groove (5*e*) disposed at the interface thereof.

9 Claims, 4 Drawing Sheets

ELBOW CABLE CONNECTOR WITH STRAIN RELIEF ELEMENT

CROSS REFERENCE TO RELATED APPLICATION

This application is a national stage entry of PCT/EP2022/070847 filed Jul. 25, 2022, under the International Convention and claiming priority over French Patent Application No. FR2108251 filed Jul. 29, 2021.

TECHNICAL FIELD

The invention relates to an elbow cable connection providing protection by strain relief in the event of accidental stress on this cable. More generally, the present invention relates to means for connecting cables to an equipment item at the output of a cable tray. The cables that are targeted within the framework of the invention are all types of cables conveying electrical energy or electronic information, such as electric cables, optical fibers, digital cables, et cetera. Notably, vehicles—aircraft, motor vehicles, trains, ships—and buildings are intended to be equipped with such connections.

The cable trays are used to support the cables when they are installed and to improve the subsequent management of access and connection to them. For example, in the aeronautical world, the cable trays installed in the aircraft allow the cables to be run and protected throughout the structure. Once the cable has been brought into the vicinity of the equipment item that it is intended to connect, it leaves the cable tray to be connected via a connector to the equipment item concerned.

Optimizing the structures causes, in particular in the aeronautical world, the free spaces available between the cable trays and the equipment items to be connected to be reduced. It is then particularly appropriate for the cables at the output of the cable trays to be adapted to the bulk and for their connectors to allow a secure connection by protecting the integrity of the cables concerned.

STATE OF THE ART

In aeronautical structures, cable trays are used to run the bundles of electric cables within the aircraft, in particular in the wings and the cabin. Indeed, the wings are equipped with movable elements such as flaps and leading-edge slats, electrically controlled, as well as engines, the main source of electricity for the aircraft. These wings therefore comprise a large number of cable bundles, essential to the correct operation of the aircraft, which are then deployed, held in cable trays, over the entire craft. In the cabin, a wired control network, notably fiber-optic-based, is also deployed. When they arrive in proximity to the equipment items, these cables leave their cable tray to be connected to the corresponding equipment items via a connector.

Traditionally, the connector is said to be straight, that is to say that it extends in the alignment of the cable, the latter generally forming a loop to occupy less space. In addition, to ensure the integrity of the cable and provide a protection with respect to external mechanical strains, a protection bar called "strain relief" is positioned at the end of the connector opposite the connection end. This straight connector provided with the strain relief is then inserted at right angles and externally to the equipment item to which it is connected, which creates bulk with respect to the connected equipment item and requires a free space in the vicinity thereof. In fact, the strain relief structurally produces a physical elongation of the connector, and the cable, through its flexibility and its arrangement at right angles to the equipment item, can undergo the "whip" effect as a result of the vibrations of particularly high intensities in the case of an aircraft.

Some equipment items are enclosed in a box and have 90-degree elbow connectors in order to be fitted therein, the connectors and the cables being contained in the box. Since the cables are protected by the box, these elbow connectors are of reduced size and do not have any strain relief. However, when the cables leave the box to be connected to an external circuit, they do so at right angles and a strain relief is then necessary to protect them with respect to external mechanical strains. The configuration is then similar to the traditional approach which uses a straight connector, which has the same drawbacks of bulk and of "whip" effect.

To reduce the free space necessary at the output of the straight connectors, the cable is generally looped, even folded, but the acceptable radius of curvature of a cable remains significant to be able to remain functional, particularly of a fiber-optic cable leaving an equipment item at right angles, which limits the gain in free space. Furthermore, to reduce the «whip» effect, it is common practice either to hold the cable with an anti-whip tie, or to reduce the radius of curvature of the looped cable. The use of anti-whip ties creates weight and additional elements, and reducing the radius of curvature of the looped cable increases the free space necessary to contain it.

SUMMARY OF THE INVENTION

In order to remedy the drawbacks of the state-of-the-art set out above, the main objective of the invention is to reduce the bulk of a connector and of its cable, thus making it possible to reduce the space necessary for the connection thereof.

For this, the invention relates to an elbow cable connection in order to reduce the radius of curvature of the cable and therefore reduce the space necessary to contain said cable. Combined with this, the elbow connection comprises a strain relief that makes it possible to protect the cable with respect to the external mechanical strains transmitted by the connection.

More specifically, the subject of the present invention is an elbow connection of at least one cable having a central section oriented in a direction at right angles to a flat face of an equipment item to be connected by this face, this central section being linked to at least two ends of the elbow cable connection connection in this right-angled direction, namely a connection end for connecting to the flat face of the equipment item and at least one so-called open end, prolonged by a fork with two branches in a longitudinal direction and extending in a plane oriented according to an angle that is acute with the direction of the central section. The fork and the central section form a cable protection conduit and the branches are terminally linked to a support housing a strain relief. This strain relief is composed of two half-shells each having: an outer face, two bearing faces at right angles to the longitudinal direction of the fork and an inner face. At least one cable gripping groove extends over at least one of the inner faces along the longitudinal direction of the fork.

Advantageously, the branches of the free end or ends are sufficiently elongate with respect to a standard elbow connection, with a length at least equal to the dimension of the strain relief, so as to be able to obtain a prolonged hold of the cables and therefore a better protection while retaining the saving in bulk. Indeed, since the elongation is not produced at right angles to the equipment item, the drawbacks of a straight connection are not reproduced. This elongation also makes it possible to free up enough space on the branches to accommodate the strain relief which adds a protection with respect to the external loadings and vibrations transmitted to the cables. This support also adds stabilization to the branches.

Also advantageously, the two-half-shell structure of the strain relief allows for fast and easy installation of the cable or cables in the grooves. In addition, the architecture of the elbow connection and the cable exit according to the angle alpha substantially reduces the bulk of the connection as well as the space necessary for this cable to be connected to the equipment item while offering better protection, which makes it possible to use cables that are more fragile, such as optical fibers, but that offer possibilities of operation in reduced environments which have high damage risks.

According to certain preferred embodiments:

the half-shells, produced in elastic material, are linked by at least one cord in extension of said bearing surfaces and secured by an attachment means chosen from among a hook, a male-female link assembly and a clip-type mechanism;

the strain relief, with a length of between 10 mm and 20 mm, is formed on the support by affixing the outer face of one of the half-shells, and held by a cover disposed on the outer face of the other half-shell, this cover being fixed to the support by at least one screw or by any other fixing means;

the bearing faces have a perimeter over which extends a lip abutting against the cover and the support;

the angle alpha between the branches and the central section is between 60° and 90° and preferably equal to 90°;

the grooves of the half-shells comprise radial tongues for adjustment to the cables, these tongues being arranged at the end of a groove on the bearing faces and/or along the grooves;

an outer protection shell is fitted onto the branches between the central section and the strain relief, and once the mechanical connection is made, the longitudinal direction of the fork of the cable connection is oriented in the direction of arrival of the cables.

Advantageously, the two half-shells of the strain relief are produced in a single piece by moulding or by 3D printing and grip the cables by snap-fitting on themselves, thus allowing for fast and easy installation. In addition, the combination of the cover and of the lips of the bearing faces immobilizes the strain relief by clamping the cover on the support and recessing the lips of the bearing faces in the longitudinal direction.

Also advantageously, the adjustment tongues have the dual function of holding the cables in the strain relief, to protect them without damaging them, as well as being able to adapt to different cable diameters.

BRIEF DESCRIPTION OF THE FIGURES

Other features and advantages of the present invention will emerge on reading the following description of an exemplary embodiment that is detailed without limiting the scope thereof, with reference to the attached figures which represent, respectively.

DETAILED DESCRIPTION OF THE INVENTION

In the figures, reference symbols that are identical refer to a same element and to the corresponding passages of the description.

Figure 1:
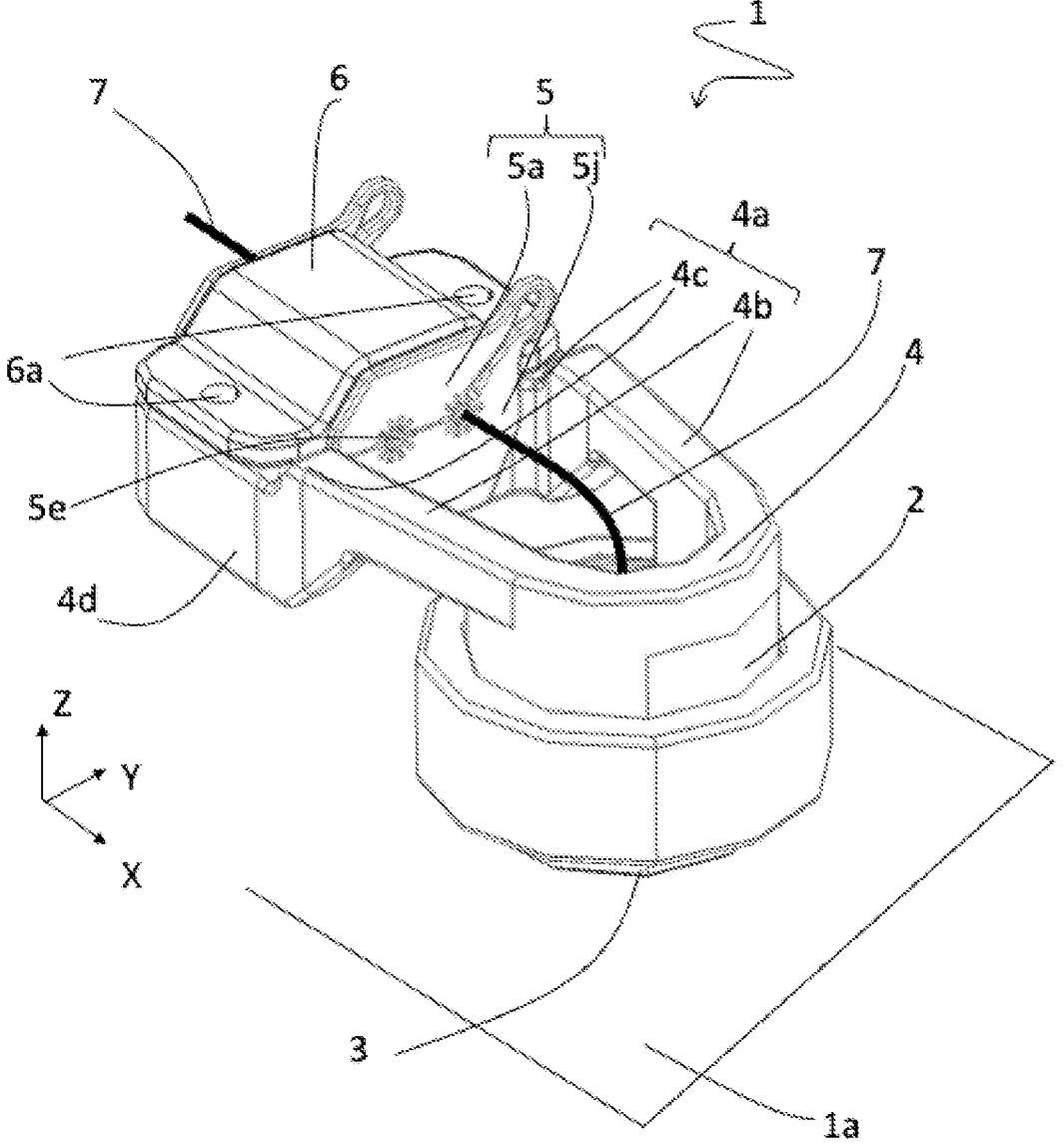
FIG. 1, a perspective view of the cable connection with a cable held in the strain relief.

The diagram of FIG. 1 illustrates an elbow cable connection 1 with strain relief facing a flat connection face 1a of an equipment item, this flat face 1a being in the plane (XY) of the orthonormal reference frame (XYZ). This elbow connection 1 allows the elbow connection of a cable 7 such as an optical fiber to an equipment item in a narrow environment. This cable 7, brought by a bundle to the vicinity of the equipment item, is gripped in the strain relief 5 then bent before being connected to the equipment item. The function of the strain relief 5, by increasing the rigidity of the part of the cable 7 that is gripped, is to protect the portion of cable 7 included in the elbow connection 1. In fact, since the cable 7 is held on the one hand by the strain relief 5 and on the other hand by the connection to the equipment item, the portion of cable included in the elbow connection 1 is isolated from the external strains that are applied to the rest of the cable.

The elbow connection 1 has a central section 2 oriented in the direction Z at right angles to the flat face 1a of an equipment item to be connected by this flat face, this central section 2 being linked to the two ends of the elbow connection 1 in this right-angled direction Z: namely the connection end 3 connecting to the flat face 1a of the equipment item and the open end 4. This connection end 3 is connected at right angles in the direction Z to the equipment item. The open end 4 is prolonged by the fork 4a with two branches 4b in the longitudinal direction X and extending in a plane oriented according to an angle alpha that is acute with the direction Z of the central section. The fork 4a and the central section 2 form a cable protection conduit 7. The branches 4b are terminally linked 4c to a support 4d housing the strain relief 5, held by a cover 6 fixed to the support by two screws 6a. The strain relief 5 can accommodate a second cable that is not represented here.

Figure 2:
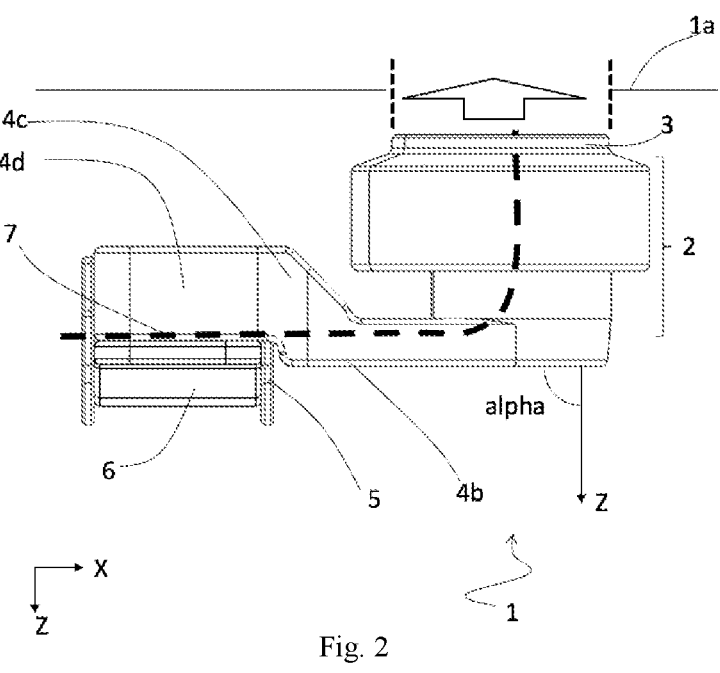
FIG. 2, a lateral view of the cable connection.

FIG. 2 presents a lateral view of the elbow connection 1 in the direction Y. The connection end 3 comes into contact with the flat face 1a, represented in cross section to identify the connection, by displacement in the direction Z to produce a mechanical connection between the elbow connection 1 and the equipment item as well as a connection of the cable 7 to the equipment item. In this exemplary embodiment, the flat face 1a is pierced to allow the insertion of the connection end 3 and produce this mechanical connection, any other mechanical coupling means being able to be used.

The cable 7 at the output of the strain relief 5 is disposed at the center of the fork 4a and laterally protected in the direction Y by the branches 4b of the free end 4, then is guided and conducted via the central section 2. The fork 4a is oriented in the so-called longitudinal direction X and extends in a plane oriented according to an angle alpha of 90° with the direction Z of orientation of the central section 2. In this exemplary embodiment, the angle alpha is equal to 90°, the latter being able to be between 60° and 90°. Since the cable 7 is an optical fiber, the latter makes a 90° turn without exceeding its maximum radius of curvature, thus making it possible to reduce the bulk of the connector in a restricted environment.

An outer protection shell can be fitted onto the branches 4b between the central section 2 and the strain relief 5 to provide an additional protection in the direction Z against external damage.

Figure 3:
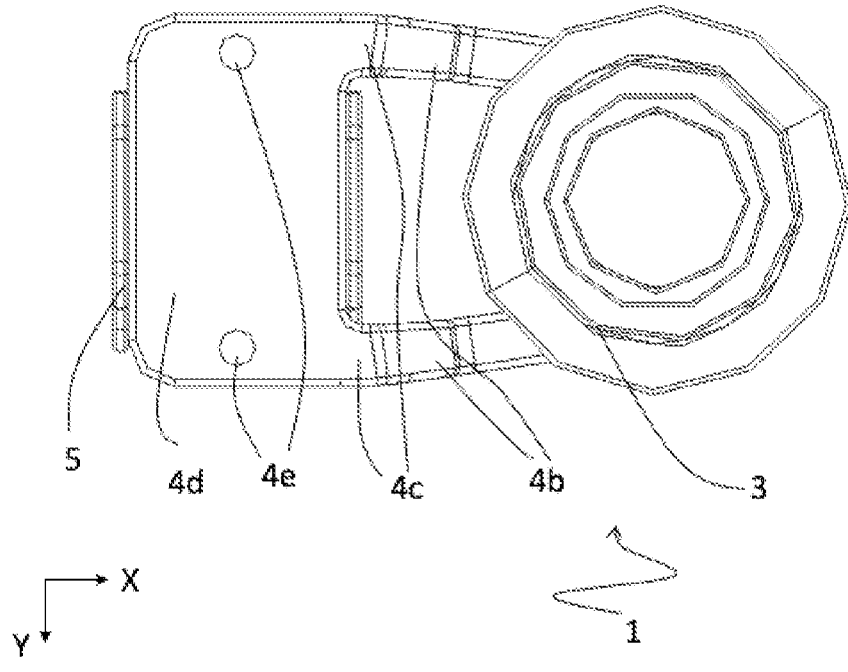
FIG. 3, a bottom view of the cable connection.

FIG. 3 represents a bottom view in the direction Z of the elbow connection 1 whose branches 4b are sufficiently extended to be linked at their termination 4c by a support 4d on which the strain relief 5 is held. This support has two bores 4e for fixing the cover 6 and holding the strain relief 5 whose length is, here, between 10 mm and 20 mm in the direction X.

Figure 4:
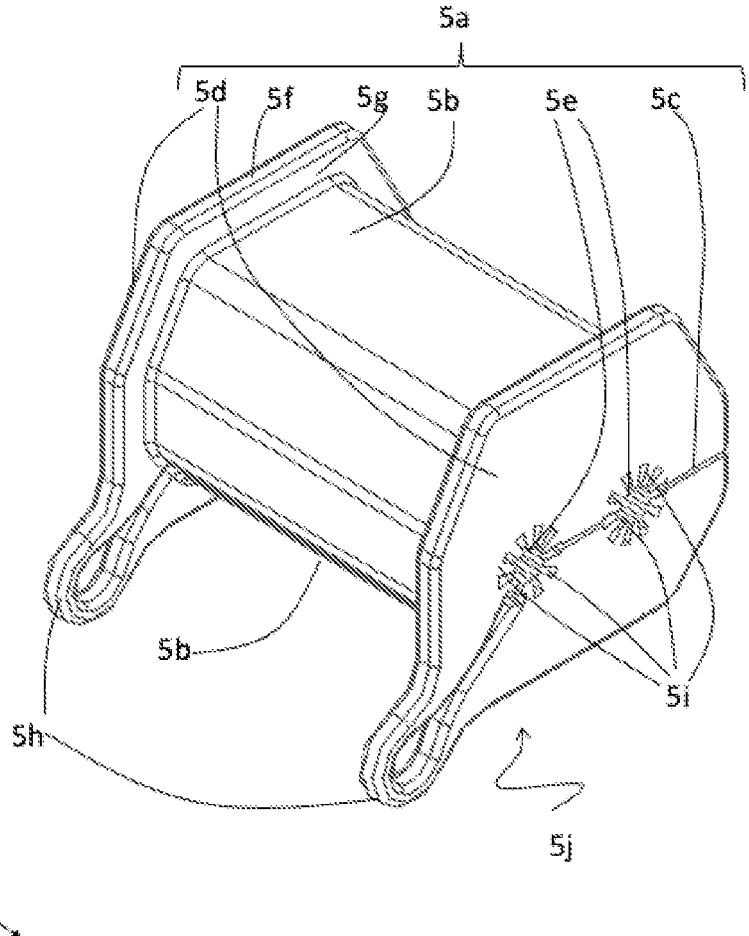
FIG. 4, a front-end view in the longitudinal direction of the cable connection without strain relief.

FIG. 4 shows a perspective view of the strain relief 5. The latter is composed of two half-shells 5a and 5j each having an outer face 5b, two bearing faces 5d at right angles to the longitudinal direction X of the fork 4a and an inner face 5c over which extend two grooves 5e for gripping along the longitudinal direction X.

These half-shells 5a and 5j, produced in elastic material, are linked by two cords 5h in extension of said bearing surfaces 5d and are secured by a male-female link assembly (not represented here). The strain relief 5 can thus be molded in a single piece and the securing of the two half-shells makes it possible to hold the cables in the strain relief 5. The bearing faces 5d have a perimeter 5f over which extends a lip 5g abutting against the cover 6 and the support 4d. The grooves 5e comprise radial tongues 5i for adjustment to the cable 7: they are arranged at the end of the grooves 5e on the bearing faces 5d. In other embodiments, these radial tongues can also be arranged along the grooves 5e independently or in combination with those on the bearing faces 5d.

Figure 5:
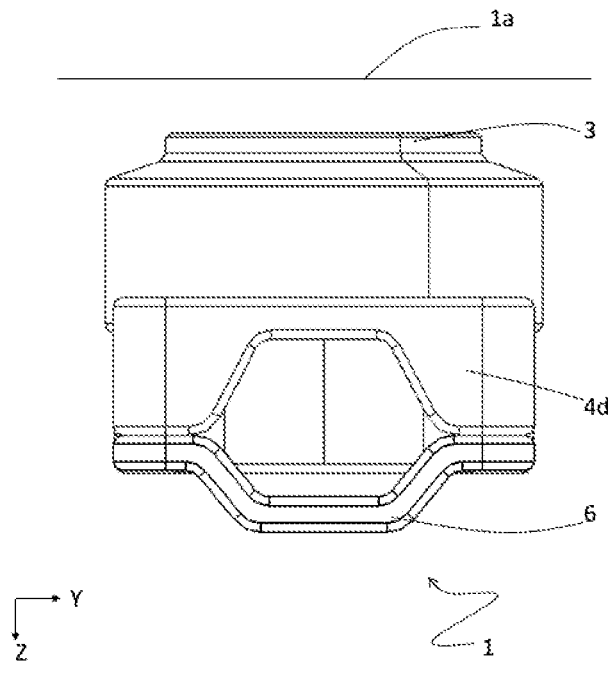
FIG. 5, a front-end view in the longitudinal direction of the cable connection with strain relief, and FIG. 6, a perspective view of the strain relief.
Figure 6:
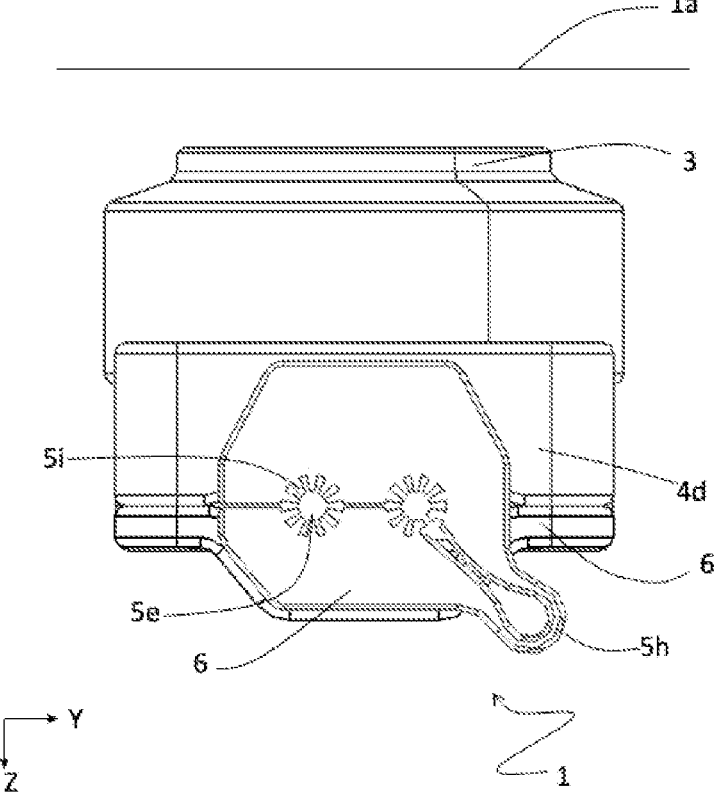

FIG. 5 and FIG. 6 present a rear view in the direction X of the elbow connection 1, FIG. 5 not including the strain relief 5. In these two figures, the connection end 3 is in the vicinity of the flat connection face 1a of the equipment item. The support 4d at the termination 4c of the branches 4b is facing and in contact with the cover 6 at two lateral contact bands in the direction X at the border of the cover 6. In FIG. 5, the strain relief 5 with a length of between 10 mm and 20 mm is formed on the support 4d by affixing the outer face 5b of one of the half-shells 5a and held by the cover 6 disposed on the outer face 5b of the other half-shell 5j by two screws 6a.

According to other embodiments not illustrated in the figures, the strain relief 5 can be fixed directly onto the support, that is to say without the addition of a cover: indeed, the securing of the half-shells 5a according to their different attachment means makes it possible to ensure the functions of the present invention without necessitating any cover.

The central section can also have a rotation mechanism to offer a plurality of orientations to the longitudinal direction of the branches of the cable connection based on the direction of arrival of the cables, the chosen orientation being lockable. This central section can also comprise more than one fork to connect to the equipment item a plurality of cables originating from bundles and therefore directions of different origins.

The invention claimed is:

1. An elbow connection (1) of at least one cable (7) having a central section (2) oriented in a direction (Z) at right angles to a flat face (1a) of an equipment item to be connected by the flat face, the central section (2) being linked to at least two ends of the cable connection (1) in a direction (Z), a connection end (3) connecting to the flat face (1a) and at least one open end (4) prolonged by a fork (4a) with two branches (4b) in a longitudinal direction (X) and extending in a plane oriented according to an angle (alpha) that is acute with the direction (Z) of the central section (2), the fork (4a) and the central section (2) forming a cable protection conduit (7), the branches (4b) being terminally linked (4c) to a support (4d), wherein the support (4d) houses a strain relief (5) composed of two half-shells (5a, 5j) each having an outer face (5b), two bearing faces (5d) at right angles to the longitudinal direction (X) and an inner face (5c), and at least one cable gripping groove (5e) extends over at least one of the inner faces (5c) along the longitudinal direction (X).

2. The cable connection (1) as claimed in claim 1, wherein the half-shells (5a), produced in plastic material, are linked by at least one cord (5h) in extension of said bearing surfaces (5d) and secured by an attachment means chosen from among a hook, a male-female link assembly and a clip-type mechanism.

3. The cable connection (1) as claimed in claim 1, wherein the strain relief (5), with a length of between 10 mm and 20 mm, is formed on the support (4d) by affixing the outer face (5b) of one of the half-shells (5a), and held by a cover (6) disposed on the outer face of the other half-shell (5j), the cover (6) being fixed to the support (4d).

4. The cable connection (1) as claimed in claim 3, wherein the bearing faces (5d) have a perimeter (5f) over which extends a lip (5g) abutting against the cover (6) and the support (4d).

5. The cable connection (1) as claimed in claim 1, wherein the angle (alpha) between the branches (4d) and the section (2) is between 60° and 90°.

6. The cable connection (1) as claimed in claim 1, wherein the grooves (5e) of the half-shells (5a, 5j) comprise radial tongues (5i) for adjustment to the cables, the radial tongues (5i) being arranged at the end of a groove (5e) on the bearing faces (5d) and/or along the grooves (5e).

7. The cable connection (1) as claimed in claim 1, wherein an outer protection shell is fitted onto the branches (4d) between the central section (2) and the strain relief (5).

8. The cable connection (1) as claimed in claim 1, wherein the longitudinal direction (X) of the fork (4a) is oriented in the direction of arrival of the cables.

9. The cable connection (1) as claimed in claim 1, wherein the cable (7) is an optical fiber.

* * * * *